US011193587B2

(12) United States Patent
 Feistel

(10) Patent No.: US 11,193,587 B2
(45) Date of Patent: Dec. 7, 2021

(54) PISTON RING FOR A PISTON COMPRESSOR, AND PISTON COMPRESSOR

(71) Applicant: BURCKHARDT COMPRESSION AG, Winterthur (CH)

(72) Inventor: Norbert Feistel, Ellikon a.d. Thur Zurich (CH)

(73) Assignee: BURCKHARDT COMPRESSION AG, Winterthur (CH)

( * ) Notice: Subject to any disclaimer, the term of this patent is extended or adjusted under 35 U.S.C. 154(b) by 148 days.

(21) Appl. No.: 16/469,407

(22) PCT Filed: Nov. 21, 2017

(86) PCT No.: PCT/EP2017/079859
§ 371 (c)(1),
(2) Date: Jun. 13, 2019

(87) PCT Pub. No.: WO2018/108464
PCT Pub. Date: Jun. 21, 2018

(65) Prior Publication Data
US 2020/0096106 A1      Mar. 26, 2020

(30) Foreign Application Priority Data
Dec. 13, 2016 (EP) .................................... 16203902

(51) Int. Cl.
*F16J 9/12*      (2006.01)
*F16J 9/26*      (2006.01)
(Continued)

(52) U.S. Cl.
CPC .............. *F16J 9/26* (2013.01); *F16J 15/006* (2013.01); *F16J 15/28* (2013.01)

(58) Field of Classification Search
CPC .......... F16J 9/00; F16J 9/02; F16J 9/06; F16J 9/064; F16J 9/12; F16J 9/16; F16J 9/20; F16J 9/203
See application file for complete search history.

(56) References Cited

U.S. PATENT DOCUMENTS 2,797,971 A * 7/1957 Greenough ............ F16J 15/162
 277/448
3,145,629 A   8/1964 Gottzmann
(Continued)

FOREIGN PATENT DOCUMENTS

CN        1407259 A    4/2003
CN     201787060 U    4/2011
(Continued)

OTHER PUBLICATIONS

International Search Report for PCT/EP2017/079859, Prepared by the European Patent Office, dated Feb. 6, 2018, 6 pages including the English Translation.

*Primary Examiner* — Gilbert Y Lee
(74) *Attorney, Agent, or Firm* — Brooks Kushman P.C.

(57) ABSTRACT

Piston ring having an endless base ring and sealing ring have a radially outwardly directed base ring face side. The sealing ring has a radially inwardly directed, circularly running sealing ring inner side with three tangential cuts separating three sealing ring segments are arranged in a circumferential direction (U). The base and sealing rings are arranged in succession in a longitudinal direction (L). A top ring is arranged to adjoin the sealing ring having a top ring has a radially outwardly directed top ring outer side and a radially inwardly directed top ring inner side. The top ring has, on the side opposite the sealing ring, a radially running return flow channel extending radially, the sealing face side protrudes in a radial direction beyond the top ring outer side and (Continued)

the base ring face side. The base and the top rings have a greater tensile strength than the sealing ring.

13 Claims, 4 Drawing Sheets

(51) Int. Cl.
*F16J 15/00* (2006.01)
*F16J 15/28* (2006.01)

(56) References Cited

U.S. PATENT DOCUMENTS

| | | |
|---|---|---|
| 6,439,578 B1 | 8/2002 | Radcliffe |
| 6,457,722 B1 | 10/2002 | Feistel |
| 2003/0006562 A1 | 1/2003 | Feistel |
| 2013/0098329 A1 | 4/2013 | Chipperfield |

FOREIGN PATENT DOCUMENTS

| | | |
|---|---|---|
| DE | 202015100869 U1 | 4/2015 |
| EP | 1146264 B1 | 10/2004 |
| WO | 9855783 A1 | 12/1998 |
| WO | 07089924 A2 | 8/2007 |

* cited by examiner

PISTON RING FOR A PISTON COMPRESSOR, AND PISTON COMPRESSOR

CROSS-REFERENCE TO RELATED APPLICATION

This application is the U.S. national phase of PCT Application No. PCT/EP2017/079859 filed on Nov. 21, 2017, which claims priority to EP Patent Application No. 16203902.8 filed on Dec. 13, 2016, the disclosures of which are incorporated in their entirety by reference herein.

The invention relates to a piston ring for a piston compressor in accordance with the preamble of claim 1. The invention furthermore relates to a piston compressor.

PRIOR ART

Piston compressors comprising a cylinder and a piston that can be moved linearly therein are known. In one possible embodiment, a piston ring is arranged on the piston, wherein the piston ring slides along the cylinder wall, ensuring that the piston ring seals off the compression chamber delimited by the cylinder and the moving piston. Document WO 98/55783A1 discloses a dry-running piston compressor having a piston ring which is arranged on the piston and rubs against the cylinder wall. This dry-running piston compressor is well-suited to the compression of hydrogen to a final pressure of up to 200 bar, for example. However, there is an increasing requirement to compress fluids to even higher final pressures. However, the known piston ring has only limited suitability for use with high pressure differences since it exhibits pronounced cold flow under load, resulting in rapid wear of the piston ring. The known piston ring thus has only limited suitability for compressors with a high final pressure of over 200 bar.

DESCRIPTION OF THE INVENTION

It is the object of the invention to design a piston ring and a piston compressor which have more advantageous operating characteristics.

This object is achieved by a piston ring having the features of claim 1. Dependent claims 2 to 8 relate to further advantageous embodiments of the invention. The object is furthermore achieved by a piston compressor having the features of claim 9. Dependent claims 10 to 12 relate to further advantageous embodiments. The object is furthermore achieved by using the piston ring according to the invention in a piston compressor to compress a fluid to a pressure of more than 500 bar.

In particular, the object is achieved by means of a piston ring comprising an endless base ring and a sealing ring, wherein the base ring has a radially outwardly directed base ring face, and wherein the sealing ring has a radially outwardly directed sealing face and a radially inwardly directed, circular sealing ring inner side, wherein the sealing ring has three tangential cuts, which extend tangentially with respect to the sealing ring inner side, with the result that the sealing ring comprises three sealing ring segments, which are arranged in succession in a circumferential direction and which are separated by the tangential cut, wherein the endless base ring and the sealing ring are arranged in succession in a longitudinal direction perpendicular to the circumferential direction, wherein a top ring is arranged so as to adjoin the sealing ring in the longitudinal direction, wherein the top ring has a radially outwardly directed top ring outer side and a radially inwardly directed top ring inner side, wherein the top ring has, on the side facing away from the sealing ring, at least one radially extending return flow channel, which extends in the radial direction along the entire width of the top ring, wherein the sealing face protrudes in the radial direction beyond the top ring outer side and the base ring face, and wherein the base ring and the top ring have a higher tensile strength than the sealing ring.

In a preferred embodiment, the tensile strength of the base ring and of the top ring is at least 1.5 times higher than the tensile strength of the sealing ring.

The piston ring according to the invention is embodied as a "sandwich" piston ring and comprises a sealing ring and support rings arranged on both sides in the axial direction, namely the base ring and the top ring, which rest on the sealing ring, wherein the support rings are preferably of plate-shaped design. In comparison with the base ring and the top ring, the sealing ring is composed of a softer material with a preferably good shape adaptation capacity, in particular a good shape adaptation capacity in the radial direction. In comparison with the base ring and the top ring, the sealing ring thus has a lower tensile strength. In the axial direction, the piston ring comprises the base ring on one side and the top ring on the other side, wherein the base ring and the top ring form the two support rings, and thus the sealing ring rests against one of the rings mentioned on each side and is held by these. The base ring and preferably also the top ring are of endless configuration and are composed of a relatively strong material, i.e. a material with a higher tensile strength than the sealing ring. The sealing ring composed of a relatively soft material or a material with a lower tensile strength is held well and reliably between the base ring and the top ring and has a good shape adaptation capacity in the radial direction, ensuring that it rests with a good seal against the inner wall of the piston and thereby prevents or reduces any leakage which may occur.

In the case of the piston ring according to the invention, the sealing ring is configured as a friction sealing element in that the sealing ring slides along the cylinder inner wall, wherein the piston ring can be operated in a dry-running manner or with lubrication. The piston ring according to the invention is preferably suitable in combination with piston compressors, the compression chamber of which has a high pressure load of preferably more than 500 bar and/or a high temperature load.

As a particular preference, the sealing ring has a small overall height in the axial direction, preferably an overall height in a range of from 1 to 6 mm. The piston ring according to the invention is mounted in the piston compressor in such a way that both the base ring and the top ring leave a small gap between the radially outwardly directed side and the cylinder inner side, at least in the cold state, e.g. a gap of a few tenths of a millimeter to a few hundredths of a millimeter. On the other hand, the sealing ring protrudes beyond the base ring and the top ring in the radial direction and touches the cylinder inner side. In an advantageous embodiment, the base ring and the top ring do not come into contact with the cylinder inner side during operation and thus do not form friction rings. In this embodiment, both the base ring and the top ring do not have to have dry-running properties. In contrast to the base ring, which is arranged on the side facing away from the compression chamber, the top ring furthermore has at least one return flow groove on the side facing the compression chamber, said groove allowing pressure dissipation into the compression chamber during the re-expansion. The base ring and the top ring, which are arranged on both sides of the sealing ring, thus prevent the sealing ring from being destroyed by the dynamically acting pressure forces acting in both directions of movement of the piston on both sides of the sealing ring. The re-expansion takes place as described below. Owing to leaks between the individual sealing elements of a sealing system, loading with a pressure characteristic which varies with respect to time also gives rise to pressure differences in the direction of the compression chamber. Thus, during the compression phase, the pressure in the sealing element chambers directly following the compression chamber rises to values above the suction pressure level and—depending on the state of wear of the sealing elements—may almost reach the final compression pressure. If the pressure in the cylinder then falls back in the direction of the suction pressure during the expansion phase, there is a pressure relief back into the compression chamber, i.e. the direction of loading of the sealing elements close to the compression chamber is reversed.

The piston ring according to the invention thus has the advantage that the sealing ring cut by tangential cuts is, on the one hand, supported during the compression process by the base ring and is supported during the expansion process by the top ring, with the result that the cut sealing ring is protected from forces with a severe action and thus from damage both during the compression process but especially also during the expansion process.

The sandwich design, according to the invention, of the piston ring makes it possible to make the sealing ring from a plastics material which per se would not be suitable for sealing high pressure differences in a "self-supporting" embodiment, i.e. without support rings. Depending on its embodiment, the piston ring according to the invention can be operated in a dry-running manner or with oil lubrication. In the case of a dry-running piston ring, at least the sealing ring must have dry-running properties. If the base and/or top ring likewise slide/slides along the cylinder inner wall during operation, these support rings should also have dry-running properties. The sealing ring is preferably formed from a PTFE material or a polymer blend, wherein high-temperature polymers are also used in the case of very high pressure differences. Dry-running sealing rings are furthermore filled with inorganic fillers, such as carbon, graphite, glass fibers, MoS2 or bronze. It is advantageous if the base ring and the top ring are composed of high-temperature polymer, fiber composite material and, in the case of very high pressure differences, of metal, e.g. bronze.

Illustrative material combinations for the base ring, the sealing ring and the top ring are given below. As already mentioned, one prerequisite is that the base ring and the top ring have a higher tensile strength than the sealing ring. Depending on the final pressure to be achieved, the following material combinations could be suitable, for example, wherein details in respect of the materials used are given after the table:

TABLE 1

Examples of material combinations for the piston rings

| | Piston ring 1 | Piston ring 2 | Piston ring 3 | Piston ring 4 |
|---|---|---|---|---|
| Top ring | High-temperature polymer | High-temperature polymer | Fiber composite material | Copper alloy (bronze) |
| Sealing ring | Mod. PTFE or filled PTFE | Polymer blend | High-temperature polymer | High-temperature polymer |
| Base ring | High-temperature polymer | High-temperature polymer | Fiber composite material | Copper alloy (bronze) |

Details below of the materials used in Table 1, wherein the filled materials indicated below are required especially in the case of dry-running rings.

Pure or filled PEEK, pure or filled polyimide, pure or filled PPS or pure or filled epoxy are suitable as high-temperature polymers, for example.

A modified PTFE, also referred to as "mod. PTFE", or a filled PTFE filled with inorganic fillers, such as carbon, graphite, glass fibers, MoS2 and/or bronze, is suitable as a PTFE.

A mixture of at least two organic plastics, such as PTFE, PEEK, PPS, is suitable as a polymer blend, wherein the polymer blend may also be filled with an inorganic filler, such as carbon, graphite, glass fibers, MoS2 and/or bronze.

Carbon fibers in a matrix of PEEK or epoxy, for example, are suitable as a fiber composite material.

Bronze materials, such as aluminum, lead or tin bronze or a material such as brass are suitable as a copper alloy, for example.

A plastic very well-suited for the sealing ring is polytetrafluoroethylene (PTFE), to which fillers, which are preferably still generally inorganic, such as carbon, graphite, glass fibers etc., are added to improve its physical, mechanical and/or tribological properties, in particular to impart dry-running properties. Despite these fillers, the use of previously known sealing rings made from PTFE was limited to low pressure differences owing to the pronounced tendency for cold flow of PTFE. The piston ring according to the invention has the advantage that a sealing ring composed of PTFE can be operated reliably even with relatively high pressure differences. This may be explained with reference to the following example of a dry-running "Piston ring 1". The illustrative piston ring 1 comprises a sealing ring composed of filled PTFE, wherein the PTFE is filled with carbon or graphite. At a temperature of 20° C., a sealing ring of this kind has a tensile strength of 10 MPa. The base ring and the top ring are composed of filled PEEK. At a temperature of 250° C., a base ring and a top ring of this kind have a tensile strength of 18 MPa. In this illustrative embodiment, the piston ring according to the invention can be operated in dry-running mode without problems at 250° C. although the sealing ring has an extremely low tensile strength at this temperature since the sealing ring is held in the axial direction between the support rings, i.e. between the base ring and the top ring, and it is not possible for the sealing ring to escape in the radial direction since it rests against the inner wall of the cylinder in the radial direction. The distance between the base ring and the top ring and the inner wall of the cylinder is preferably a few tenths to a few hundredths of a millimeter.

The illustrative "Piston ring 1" can also be used to seal off the compression chamber in an oil-lubricated piston compressor. In this case, the sealing ring could be composed of modified PTFE, for example, and the base ring and top ring could be composed of pure PEEK, for example. The base ring and the top ring could also be composed of a filled PEEK, for example, wherein the PEEK is filled with carbon fibers (10% by weight), PTFE (10% by weight) and graphite (10% by weight).

For a piston with a high pressure and/or temperature loading, it would be possible, as illustrated above by means of the example comprising "Piston ring 3" and "Piston ring 4", to use a piston ring comprising a sealing ring composed of a high-temperature polymer, such as polyether ether ketone (PEEK) or polyimide (PI) and comprising a top ring and base ring composed of a fiber composite material, such as carbon fibers in a matrix of PEEK or carbon fibers in an epoxy matrix.

Particularly in the case of oil-lubricated piston compressors, pressure differences can also assume very high values of over 1000 bar, and therefore, as illustrated above by "Piston ring 4", it is also possible to use piston rings comprising a base ring and a top ring consisting of a one-piece metal ring, especially in the case of such piston compressors.

The invention is described further in detail below by means of illustrative embodiments.

BRIEF DESCRIPTION OF THE DRAWINGS

In the drawings used to illustrate the illustrative embodiments.

In the drawings, identical parts are basically provided with identical reference signs.

EMBODIMENTS OF THE INVENTION

Figure 1:
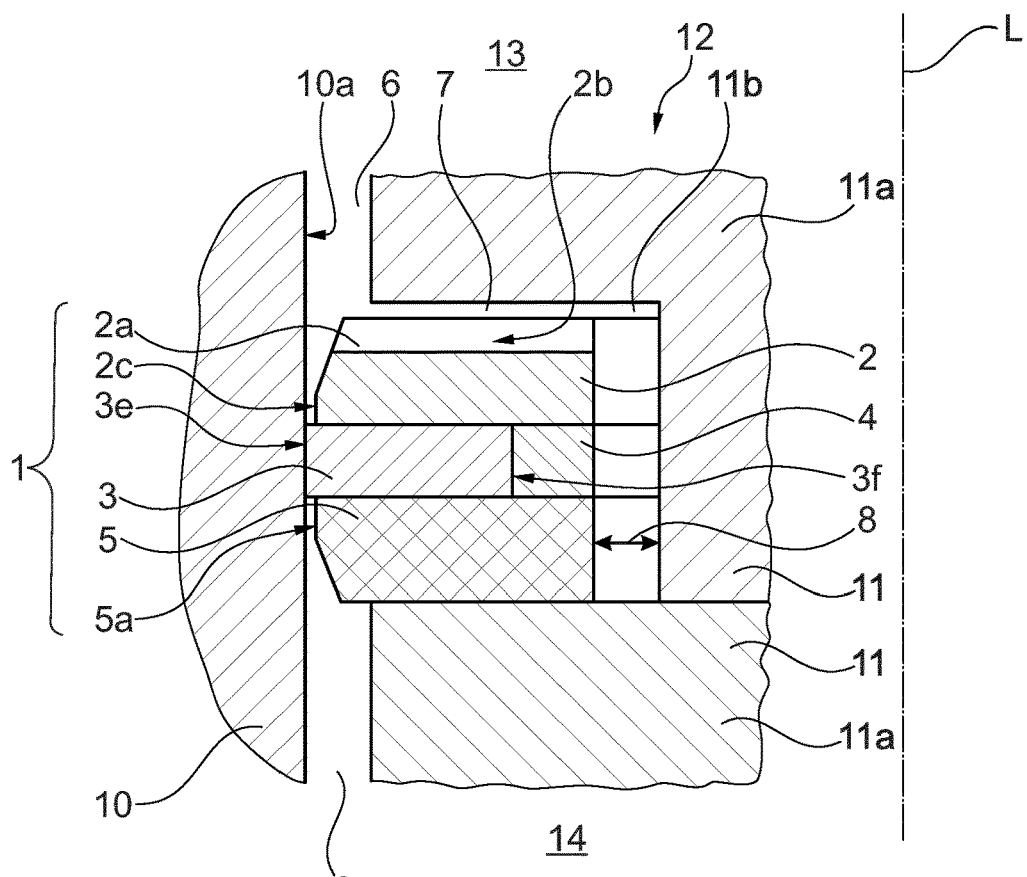
FIG. 1 shows a longitudinal section of a seal arrangement arranged on a piston.

FIG. 1 shows a longitudinal section through a piston compressor comprising a cylinder 10, a piston 12 and at least one piston ring 1 arranged in the piston 12. The piston 12 is configured as an assembled piston and comprises a plurality of piston bodies 11 arranged in succession in a longitudinal direction L, wherein each piston body 11 has a chamber disk 11a, which forms an interior space 11b. A piston ring 1 is arranged in the interior space 11b. In FIG. 1, the compression chamber 13 of the piston compressor is arranged at the top, and the crankcase or low-pressure part 14 is arranged at the bottom. The piston ring 1 comprises a sealing ring 3, a clamping ring 4, a top ring 2 and a base ring 5. The piston ring 1 is spaced apart from the chamber disk 11a in the radial direction with respect to the longitudinal axis L, thereby forming an inner gap 8. The inner gap 8 is fluidically connected, via a radial return flow channel 2a and the outer gap 6 arranged at the top, to a space which is further up in the view illustrated and is not visible.

Figure 2:
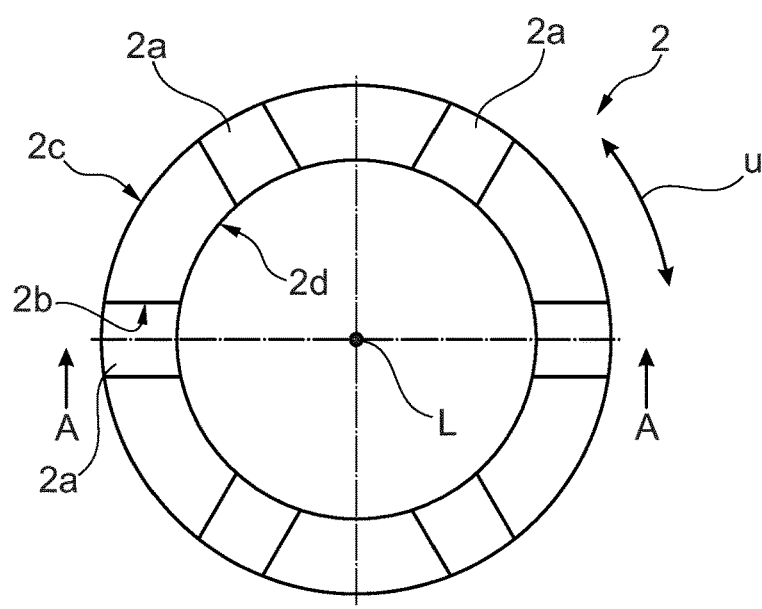
FIG. 2 shows a plan view of a top ring.

FIG. 2 shows a plan view of the top ring 2 from the direction of the compression chamber 13. The top ring 2 comprises a radially outwardly directed top ring outer side 2c and a circular, radially inwardly directed top ring inner side 2d. The top ring 2 is configured as an endless ring and comprises a plurality of radial return flow channels 2a, which are arranged in a manner distributed in the circumferential direction and extend in the radial direction along the entire width of the top ring 2.

Figure 3:
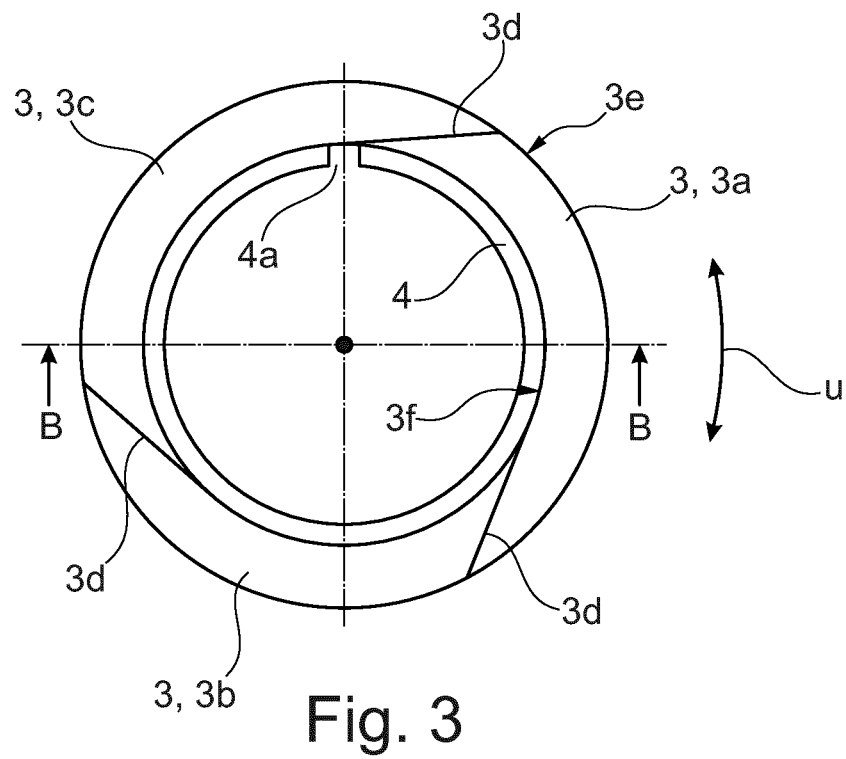
FIG. 3 shows a plan view of a sealing ring with a clamping ring.

FIG. 3 shows a plan view of the sealing ring 3 from the direction of the compression chamber 13. The sealing ring 3 comprises a radially outwardly directed sealing face 3e and a radially inwardly directed, circular sealing ring inner side 3f, wherein the sealing ring 3 has three tangential cuts 3d, which extend tangentially with respect to the sealing ring inner side 3f, with the result that the sealing ring 3 comprises three sealing ring segments 3a, 3b, 3c, which are arranged in succession in a circumferential direction U and which are separated by the tangential cut 3d. A clamping ring 4 having a clamping ring gap 4a is advantageously arranged so as to rest against the sealing ring inner side 3f. The clamping ring 4, which makes contact along the sealing ring inner side 3f, brings about a radially outwardly directed force on the sealing ring inner side 3f. It would also be possible to dispense with the clamping ring 4, wherein a fluid in the interior space 11b could bring about a radially outwardly directed force on the sealing ring inner side 3f.

Figure 4:
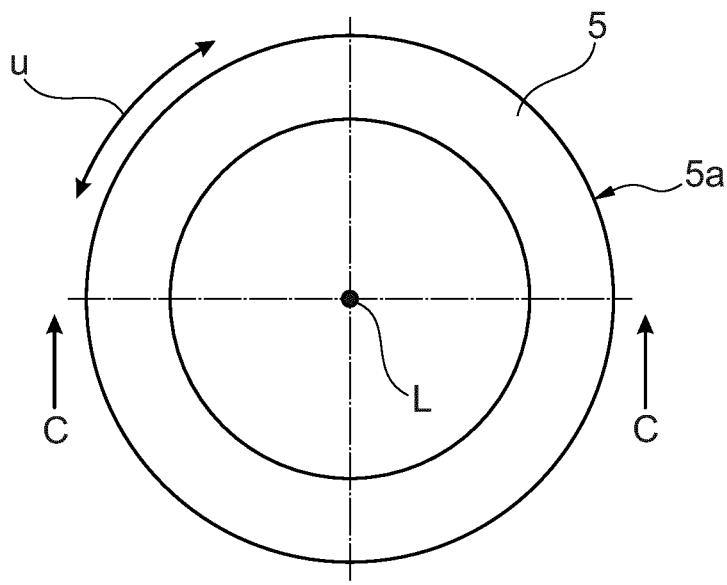
FIG. 4 shows a plan view of a base ring.

FIG. 4 shows a plan view of the base ring 5, which has a radially outwardly directed base ring face 5a.

The endless base ring 5 and the sealing ring 3 are arranged in succession in a longitudinal direction L perpendicular to the circumferential direction U, wherein the endless top ring 2 is arranged so as to adjoin the sealing ring 3 in the longitudinal direction L, with the result that, as illustrated in FIG. 1, the piston ring 1 formed comprises the base ring 5, the sealing ring 3 and the top ring 2.

In the new condition, i.e. before the sealing ring 3 has been run in for a certain time, the sealing ring 3 is configured in such a way that the sealing face 3e thereof protrudes in the radial direction beyond the top ring outer side 2c and the base ring face 5a, as illustrated in FIG. 1. To ensure that the supporting and protective effect of the top ring 2 and the base ring 5 for the sealing ring 3 is as great as possible, the clearance between the top ring 2 and/or the base ring 5 and the inner wall of the cylinder 10 or cylinder bore 10a is preferably kept to a minimum. In the illustrative embodiment illustrated in FIG. 1, the outside diameter of at least the top ring 2 and/or the base ring 5 is just a few hundredths of a millimeter or a few tenths of a millimeter less than the inside diameter of the cylinder bore 10a. Owing to the heating of the piston ring 1 during operation, it undergoes thermal expansion. In an advantageous embodiment, the outside diameter of the top ring 2 and/or of the base ring 5 increases to a diameter equal to or greater than the cylinder bore. If the outside diameter of the base ring 5 and/or the top ring 2 attempts to expand to a diameter greater than the cylinder bore, the result is that the top ring 2 and/or the base ring 5 rest against the cylinder inner wall 10a during a run-in phase and, during this process, material is worn away from the top ring 2 and/or from the base ring 5 on the outer face, with the result that the top ring 2 and/or the base ring 5 fit without clearance in the bore of the cylinder 10 in the hot state due to operation. To ensure that jamming of the top ring 2 and/or the base ring 5 does not occur during this run-in process, the faces which are oriented toward the cylinder inner wall 10 are preferably designed to at least partially widen, preferably to widen conically, ensuring that only the region which would otherwise protrude beyond the cylinder inner wall 10 has to be worn away, rather than the entire width of the top ring 2 and/or the base ring 5. During the run-in phase, the sealing ring 3 is furthermore worn away at the sealing face 3e thereof, with the result that, in a preferred embodiment and in the heated state, the sealing ring 3, the top ring 2 and the base ring 5 are arranged without clearance in the bore of the cylinder 10.

Figure 5:
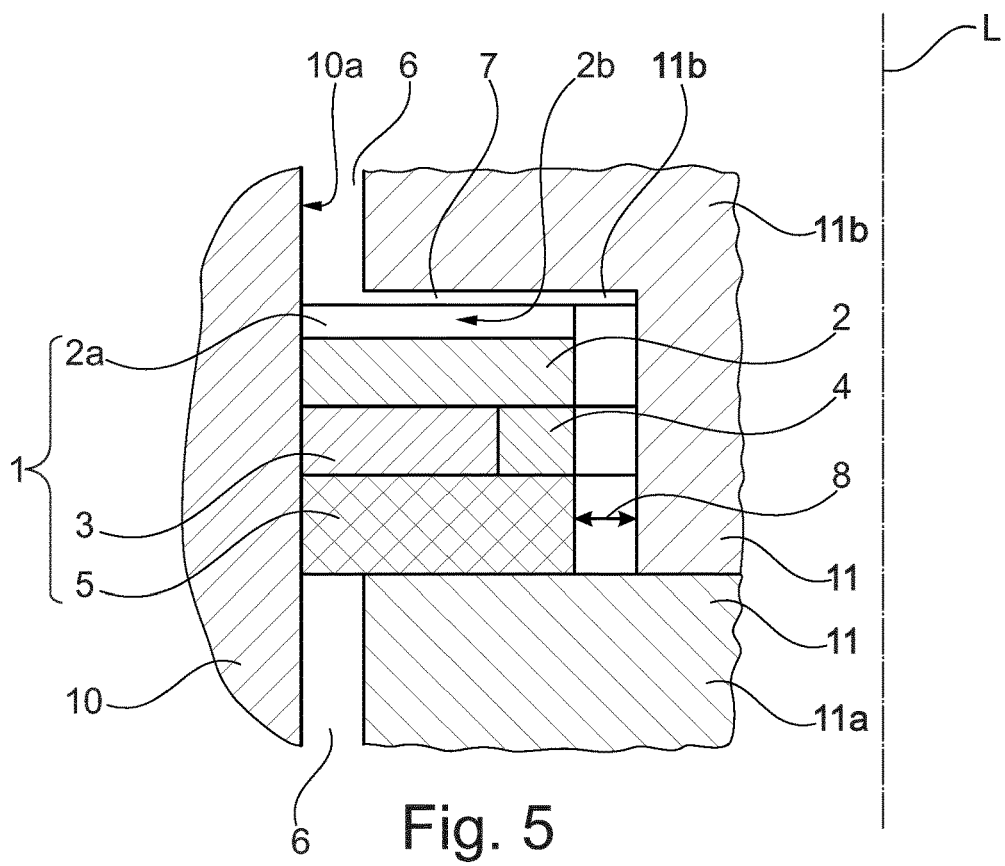
FIG. 5 shows a longitudinal section through a second illustrative embodiment of a seal arrangement.

However, as illustrated in FIG. 5, it is also possible to dispense with a conical configuration of the top ring outer side 2c and/or of the base ring face 5a. FIG. 5 shows a piston ring 1 in the run-in state and during operation, i.e. in the heated state. The top ring 2 and the base ring 5 have adapted to the cylinder inner wall 10a in such a way that, in the hot state due to operation, they move backward and forward without clearance in the direction in which the longitudinal axis L extends. Moreover, the sealing ring 3 is adapted in such a way that it is arranged between the top ring 2 and the base ring 5 in a manner which allows it to be moved outward in the radial direction and with a preloading force substantially determined by the clamping ring 4, and makes frictional contact with the cylinder inner wall 10a.

Figure 6:
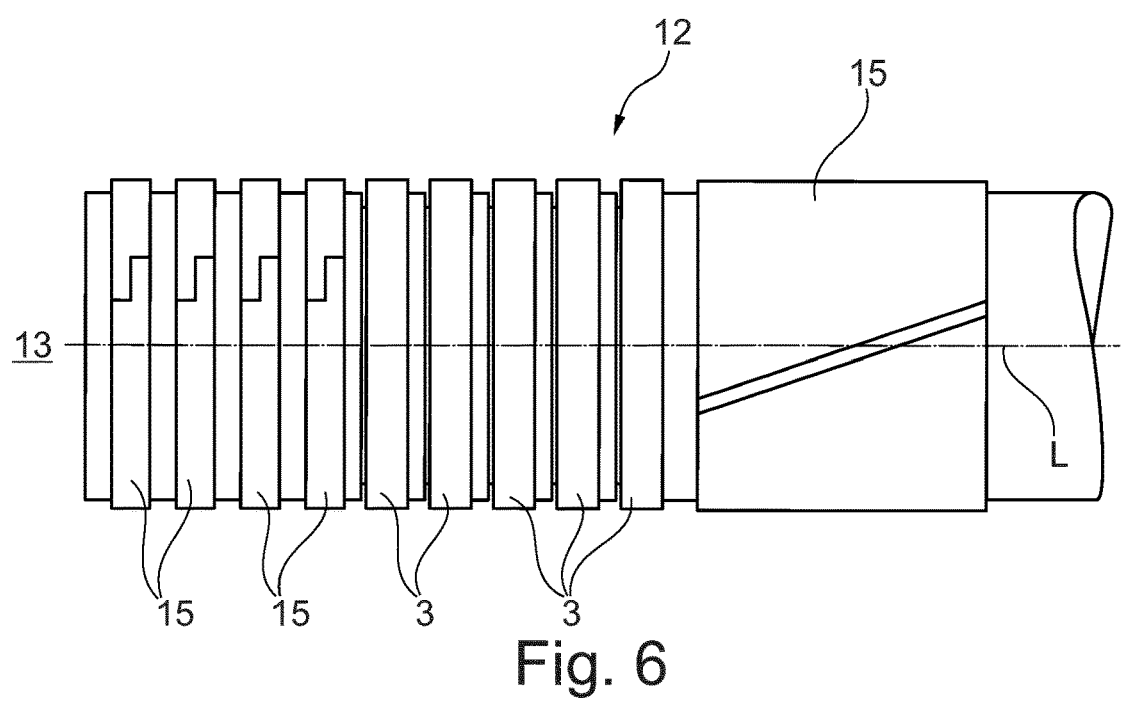
FIG. 6 shows a side view of a piston having a plurality of seal arrangements.

FIG. 6 shows, in a side view, one illustrative embodiment of a piston 12, which, starting from the high-pressure side 13, has a plurality of sealing elements spaced apart in the longitudinal direction L, namely four captive piston rings 15 on the left and, in succession in the longitudinal direction L, five piston rings 1. A guide ring 15 is furthermore arranged on the right.

Figure 7:
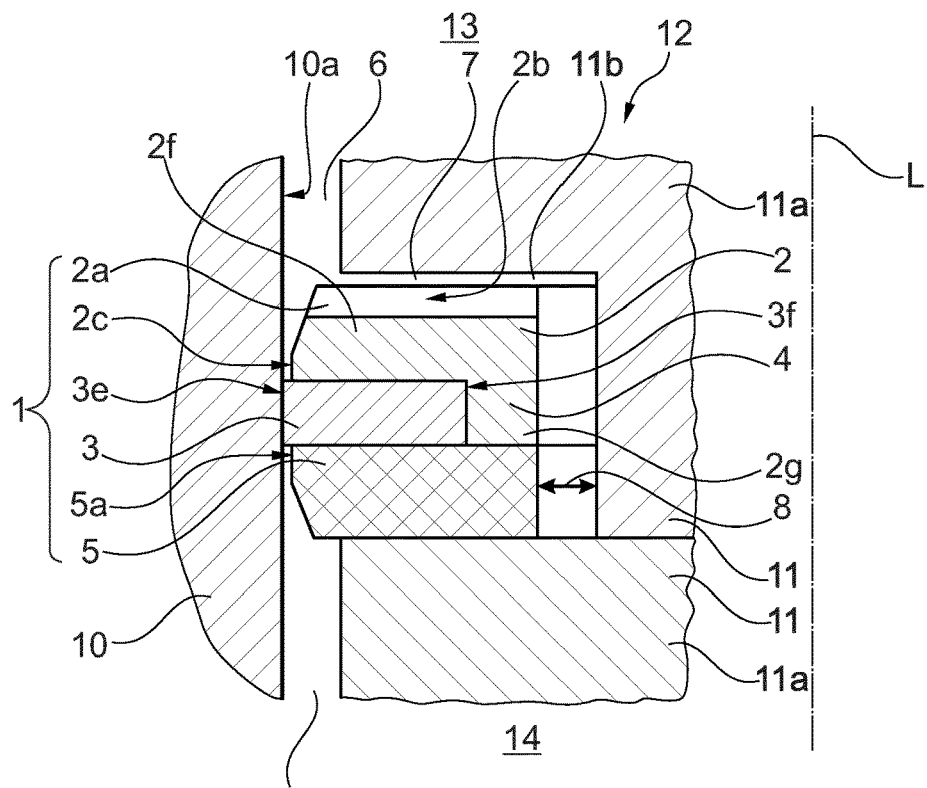
FIG. 7 shows a longitudinal section through a third illustrative embodiment of a seal arrangement.
Figure 8:
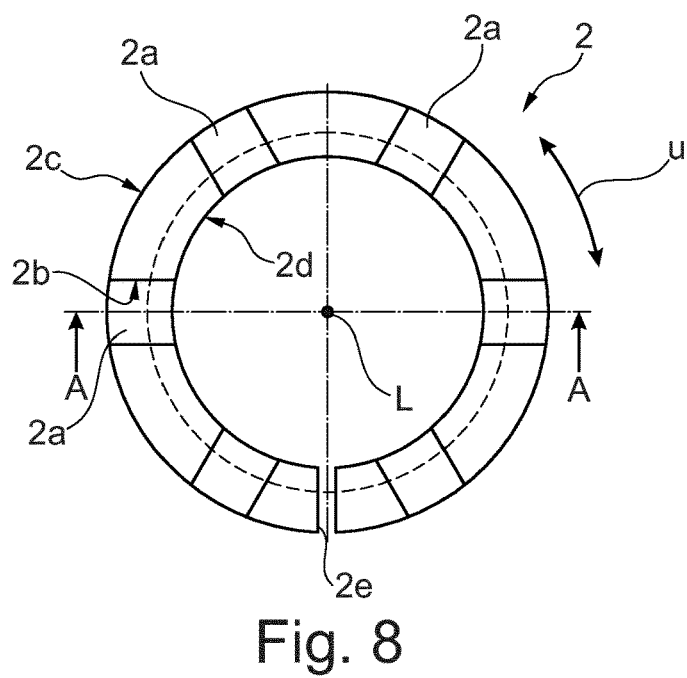
FIG. 8 shows a plan view of a top ring.

FIG. 7 shows a longitudinal section of a third illustrative embodiment of a seal arrangement 1. FIG. 8 shows a plan view of the top ring 2 used in FIG. 7. In contrast to the illustrative embodiment shown in FIGS. 1 and 2, the top ring 2 has a radial cut 2e and thus has a joint or a gap at this point. The top ring 2 is thus no longer configured as an endless top ring 2 but as a cut top ring 2. Moreover, in contrast to the illustrative embodiment shown in FIGS. 1 and 2, the top ring 2 has an L-shaped cross section with a first leg 2f extending radially with respect to the longitudinal axis L and a second leg 2g extending in the direction of the longitudinal axis L. The sealing element 3 is arranged in front of the second leg 2g in the radial direction, wherein the second leg 2g preferably rests against the sealing ring inner side 3f of the sealing element 3. The second leg 2g, which is arranged behind the sealing element 3 in the radial direction furthermore has the characteristics of a clamping ring or of a spring and thus performs the function of a clamping ring or spring. The force acting outward in the radial direction on the sealing element 3 is generated by spring properties of the top ring 2 and/or by the internal pressure prevailing in the inner gap 8 and acting on the top ring 2. The top ring 2, which has a radial cut 2e, has particularly pronounced properties of a friction ring owing to the radial cut 2e, wherein the top ring 2 simultaneously brings about a force acting outward in the radial direction on the sealing element 3 by means of the second leg 2g, making it possible to dispense with a separate clamping ring 4 such as that illustrated in FIGS. 1 and 5.

The invention claimed is:

1. A piston ring comprising an endless base ring and a sealing ring, wherein the base ring has a radially outwardly directed base ring face (5a), and wherein the sealing ring has a radially outwardly directed sealing face and a radially inwardly directed, circular sealing ring inner side, wherein the sealing ring has three tangential cuts, which extend tangentially with respect to the sealing ring inner side, with the result that the sealing ring comprises three sealing ring segments, which are arranged in succession in a circumferential direction (U) and which are separated by the tangential cut, wherein the endless base ring and the sealing ring are arranged in succession in a longitudinal direction (L) perpendicular to the circumferential direction (U), characterized in that a top ring is arranged so as to adjoin the sealing ring in the longitudinal direction (L), in that the top ring has a radially outwardly directed top ring outer side and a radially inwardly directed top ring inner side (2d), in that the top ring has, on the side facing away from the sealing ring, at least one radially extending return flow channel, which extends in the radial direction along the entire width of the top ring, in that the sealing face protrudes in the radial direction beyond the top ring outer side and the base ring face, and in that the base ring and the top ring have a higher tensile strength than the sealing ring.

2. The piston ring as claimed in claim 1, wherein the top ring is designed as an endless top ring.

3. The piston ring as claimed in claim 1, wherein a clamping ring makes contact along the sealing ring inner side, and in that the clamping ring brings about a radially outwardly directed force on the sealing ring inner side.

4. The piston ring as claimed in claim 1, wherein the top ring has a radial cut, in that the top ring has an L-shaped cross section with a first leg extending radially with respect to the longitudinal axis (L) and a second leg extending in the direction of the longitudinal axis (L), wherein the sealing ring inner side of the sealing ring is oriented toward the second leg.

5. The piston ring as claimed in claim 1, wherein the tensile strength of the base ring and of the top ring is at least 1.5 times higher than the tensile strength of the sealing ring.

6. The piston ring as claimed in claim 1, wherein the sealing ring has a height in a range of from 1 to 6 mm in the longitudinal direction (L).

7. The piston ring as claimed in claim 1, wherein the base ring face and/or the top ring outer side taper/tapers in the axial direction (L), starting from the sealing ring.

8. The piston ring as claimed in claim 7, wherein the base ring face and/or the top ring outer side taper/tapers conically in the axial direction (L).

9. A piston compressor comprising a piston ring as claimed in claim 1.

10. The piston compressor as claimed in claim 9, comprising a piston and a cylinder having a cylinder bore, wherein the base ring and/or the top ring have/has an outside diameter which is less than one tenth of a millimeter and preferably only a few hundredths of a millimeter smaller than the inside diameter of the cylinder bore.

11. The piston compressor as claimed in claim 10, wherein the base ring and/or the top ring have/has an outside diameter in the cold state such that the base ring and/or the top ring are/is arranged without clearance in the cylinder in the heated state.

12. The piston compressor as claimed in claim 9, comprising a piston having a piston body and a plurality of piston rings, wherein the piston body has a plurality of circumferential grooves, which are arranged in succession in the axial direction (L) and in each of which a piston ring is arranged, wherein the axial width of the circumferential groove is greater than the total axial width of the piston ring, and wherein the piston ring is arranged at a radial distance from the piston body on the radially inwardly directed side.

13. A method of sealing a compressed fluid in a piston compressor, wherein the method comprises providing the piston ring of claim 1, compressing a fluid to a pressure of between 500 bar and 1000 bar.

* * * * *